US012243680B2

(12) United States Patent
Polak

(10) Patent No.: US 12,243,680 B2
(45) **Date of Patent: *Mar. 4, 2025**

(54) METHOD AND DEVICE FOR PRODUCING SOFT MAGNETIC STRIP MATERIAL FOR STRIP RING CORES

(71) Applicant: Vacuumschmelze GmbH & Co. KG, Hanau (DE)

(72) Inventor: Christian Polak, Blankenbach (DE)

(73) Assignee: VACUUMSCHMELZE GMBH & CO. KG, Hanau (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/781,142

(22) Filed: Feb. 4, 2020

(65) Prior Publication Data

US 2020/0185151 A1 Jun. 11, 2020

Related U.S. Application Data

(63) Continuation of application No. 14/394,582, filed as application No. PCT/DE2012/200027 on Apr. 16, 2012, now Pat. No. 10,580,571.

(51) Int. Cl.
*H01F 41/04* (2006.01)
*C21D 1/26* (2006.01)
(Continued)

(52) U.S. Cl.
CPC ......... *H01F 41/04* (2013.01); *F27B 17/0016* (2013.01); *F27D 3/0024* (2013.01); (Continued)

(58) Field of Classification Search
None
See application file for complete search history.

(56) References Cited

U.S. PATENT DOCUMENTS 5,786,762 A 7/1998 Liu
6,171,408 B1 1/2001 Herzer et al.
(Continued)

FOREIGN PATENT DOCUMENTS

CN 100375128 C 3/2008
CN 101371321 A 2/2009
DE 19653428 C1 3/1998

OTHER PUBLICATIONS

International Search Report for PCT/DE2012/200027 dated Jan. 23, 2013 and English translation.
(Continued)

*Primary Examiner* — Xiaowei Su
(74) *Attorney, Agent, or Firm* — Dickinson Wright PLLC

(57) ABSTRACT

A method for producing soft magnetic strip material for roll tape-wound cores with the following steps: preparing a band-shaped material, applying a heat-treatment temperature to the band-shaped material, and applying a tensile force to the temperature-applied band-shaped material in one longitudinal direction of the band-shaped material in order to produce a tensile stress in the band-shaped material, to produce the soft magnetic strip material from the band-shaped material, the method, moreover, comprising determining at least one magnetic measurement value of the soft magnetic strip material that has been produced and controlling the tensile force for setting the tensile stress in a reaction to the determined magnetic measurement value. Furthermore, a device for carrying out the method and a roll tape-wound core produced by means of the method are made available.

11 Claims, 9 Drawing Sheets

(51) Int. Cl.

| | |
|---|---|
| ***C21D 9/00*** | (2006.01) |
| ***F27B 17/00*** | (2006.01) |
| ***F27D 3/00*** | (2006.01) |
| ***H01F 1/153*** | (2006.01) |
| ***H01F 3/04*** | (2006.01) |
| ***H01F 27/25*** | (2006.01) |
| ***H01F 41/02*** | (2006.01) |

(52) U.S. Cl.

CPC ........... *H01F 1/15333* (2013.01); *H01F 3/04* (2013.01); *H01F 27/25* (2013.01); *H01F 41/0226* (2013.01); *F27D 2003/0034* (2013.01); *H01F 1/15316* (2013.01)

(56) References Cited

U.S. PATENT DOCUMENTS

| | | | | |
|---|---|---|---|---|
| 6,645,314 | B1 * | 11/2003 | Herzer | C21D 1/04 148/108 |
| 9,773,595 | B2 | 9/2017 | Herzer et al. | |
| 10,347,405 | B2 * | 7/2019 | Herzer | H01F 1/15333 |
| 10,538,822 | B2 * | 1/2020 | Polak | C21D 8/0205 |
| 10,580,571 | B2 * | 3/2020 | Polak | F27B 17/0016 |
| 11,085,094 | B2 * | 8/2021 | Polak | C22C 38/12 |
| 2008/0196795 | A1 | 8/2008 | Waeckerle et al. | |

OTHER PUBLICATIONS

Arnold (Soft Magnetic Application Guide, Arnold Magnetic Technologies, 2015).
Miguel (Journal of Magnetism and Magnetic Materials, 2005, vol. 294, p. 245-251).
Barandiaran et al. (IEEE Transactions on Magnetics, 1986, vol. MAG-22, No. 6, p. 1864-1867).
Herzer (Journal of Physics: Conference Series, 2011, vol. 266, 012010, Published online on Jan. 28, 2011).
Dmitrieva (Journal of Magnetism and Magnetic Materials, 1999, vol. 196-197, p. 320-321).

* cited by examiner

METHOD AND DEVICE FOR PRODUCING SOFT MAGNETIC STRIP MATERIAL FOR STRIP RING CORES

This U.S. continuation application claims priority to U.S. patent application Ser. No. 14/394,582, filed Apr. 15, 2015, which is a 371 national phase entry of PCT/DE2012/200027, filed 16 Apr. 2012, the entire contents of which is incorporated herein by reference for all purposes.

BACKGROUND

1. Field

The disclosure relates to a method for producing soft magnetic strip material, especially a method for producing soft magnetic strip material for roll tape-wound cores and a device for carrying out the method.

2. Description of Related Art

Soft magnetic material is used in different applications. Thus, for example, it is used in the form of strips of nanocrystalline alloys in wound magnetic cores, so called annular tape-wound cores that are used, i.a., in current transformers, power transfer systems and power inductors as well as magnetic converter heads or current converter cores. Various production methods and the pertinent production devices are known for producing the soft magnetic material.

The known production devices are generally made as continuous annealing systems and enable heat treatment of rapidly solidified magnetic material (hereinafter "tape material"). The rapidly solidified magnetic material is produced by a casting process and then wound into a roll in order to then be fed as a continuous tape into the continuous annealing system and to be processed by the latter to form a soft magnetic material. Within the scope of processing, the material is heat-treated and at the same time placed under tensile stress to obtain the desired magnetic properties of the tape.

U.S. Pat. No. 6,171,408 B1 describes a corresponding production method for annular tape-wound cores that consist of amorphous ferromagnetic material. The method calls for casting an amorphous ferromagnetic tape that is then moved through a heated environment and is at the same time exposed to a magnetic field. The speed of movement is matched to the heated environment such that defined heating of the tape for a defined time interval takes place.

A production device that can be used for this method is described in, for example, U.S. laid-open specification US2008/0196795A1. The device comprises a work-holding spindle for holding a tape coil of amorphous cast tape material. The device furthermore comprises a temperature-controlled, tunnel-shaped furnace for producing a nanocrystalline strip from the amorphous tape material and at least one S-shaped unit that is located upstream from one entrance of the tunnel-shaped furnace for the tape material and is connected to a braking motor and a clamping device for setting the tensile force in the longitudinal direction of the amorphous tape material. A control apparatus in conjunction with a dynamometer controls the braking motor of the S-shaped unit located upstream from the entrance of the tunnel-shaped furnace.

In addition, there is a second S-shaped unit that is located following an exit of the tunnel-shaped furnace and is connected to a motor. The device, moreover, has a winding mandrel for the nanocrystalline strip produced for manufacturing a magnetic core of nanocrystalline material. Using this device, the amorphous tape material that has been wound into a coil on the work-holding spindle is again unwound from the latter and passes through the first S-shaped unit located upstream from the entrance of the tunnel-shaped furnace, then the dynamometer and the following tunnel-shaped furnace before it passes the second S-shaped unit located at the exit of the tunnel-shaped furnace and is wound on the following winding mandrel as described above to form the magnetic core.

One example of a magnetic core wound in this way from nanocrystalline material is also known from U.S. Pat. No. 7,583,172 B2. This core is used, i.a., in current sensors and should have permeability that is as low as possible in this respect for purposes of sufficient measuring accuracy.

The known devices and production methods therefore call for the amorphous tape material that is to be processed to be placed under tensile stress during heat treatment. In this way, via the prevailing tensile stress, anisotropy in the tape material can be induced so that the soft magnetic strip material produced from it has a pronounced flat hysteresis loop with a defined permeability μ (according to the induced anisotropy) along the direction of the tensile stress since a permeability level that can be achieved within the scope of the described production method is dependent on the applied tensile stress.

SUMMARY

In this connection, however, the disadvantage in the known process is that the prepared amorphous tape material that is to be processed, as a result of production by means of the described casting method and the subsequent winding and unwinding into a coil and for treatment in the continuous annealing furnace, has a tape thickness that changes locally in the longitudinal direction of the tape. In combination with a tape width that is generally constant as a result of production, this leads to a respective local cross-sectional area varying in the longitudinal direction of the tape depending on the site. This results in that due to the applied tensile force with a fluctuating cross-sectional area, likewise the locally prevailing tensile stress is of different magnitudes. According to the above-described relationship, this in turn leads to the fact that the locally-induced anisotropy and thus the local permeability also change with the fluctuating cross-sectional area.

Not only does the described cross-sectional area change, however, but also other parameters such as the heat-treatment temperature, a magnetic field that can be optionally provided, the passage speed of the tape, the furnace length, the heat conduction and heat transfer to the tape, the tape thickness and the alloy that is used influence the induced anisotropy $K_u$ in this process. Since these parameters can never be kept constant in practice, accordingly the locally-induced anisotropy and thus the local permeability also change.

An object of embodiments of the invention is therefore to eliminate or at least to reduce the above-described disadvantages, and especially to make available a soft magnetic strip material with a permeability characteristic as constant as possible along a longitudinal path of the strip material.

This object may be achieved according to embodiments of the invention by means of a method and a device as described herein.

Accordingly, a method for producing soft magnetic strip material for roll tape-wound cores is proposed with the following steps:

preparing a band-shaped material, heat-treating the band-shaped material at a heat-treatment temperature, applying a tensile force to the heat-treated band-shaped material in the longitudinal direction of the band-shaped material in order to produce a tensile stress in the band-shaped material, whereby to produce the soft magnetic strip material from the band-shaped material, the method, moreover, comprises the following:

determining at least one magnetic measurement value of the soft magnetic strip material that has been produced, and controlling the tensile force for setting the tensile stress in a reaction to the determined magnetic measurement value.

The sequence of steps can also vary depending on the application.

Therefore, a prepared band-shaped material, especially amorphous band-shaped material, is provided that in a subsequent step is subjected to heat treatment by exposure to the heat-treatment temperature. Then, the band-shaped material is exposed to the described tensile force at the same time with heat treatment and/or subsequently thereto in order to produce a tensile stress in the band-shaped material. By way of the prevailing tensile stress, a structural change of the material and thus an anisotropy, for example a transverse anisotropy, can be induced in the band-shaped material. For example, the tensile stress is set such that the soft magnetic strip material produced by means of the method has a pronounced flat hysteresis loop with a defined permeability μ in the direction of the tensile stress. The tensile force can be applied simultaneously with the heat treatment.

As already described above, here the induced anisotropy is proportional to the added tensile stress, the permeability being dependent upon the anisotropy. A graphic representation and detailed description of the relationships are given in FIGS. 3A and 3B and the pertinent description.

By means of the described steps, a soft magnetic strip material with defined magnetic properties or an altered structure is produced from the band-shaped material and is then measured to determine one or more magnetic measurement values. The latter allow conclusions regarding the magnetic properties of the produced strip material, for example for a magnetic characterization of the soft magnetic strip material that has been produced. One exemplary enumeration of the magnetic measurement values that can be determined is given below.

With knowledge of the at least one magnetic measurement value, then the tensile force can be controlled as described in order in this way to set the tensile stress to a desired value. Therefore, by means of the tensile force, the tensile stress is varied, the control of the tensile force taking place depending on the determined at least one magnetic measurement value.

According to one embodiment, in the step of controlling the tensile force, the latter is varied such that the tensile stress in the longitudinal direction of the band-shaped material is kept essentially constant at least in segments along the longitudinal direction. Accordingly, the tensile force is changed such that the tensile stress that is prevailing locally in the band-shaped material can be kept constant. In this way, an influence on the local tensile stress can be compensated by the local cross-sectional area that fluctuates over the longitudinal path of the band-shaped material due to production such that a fluctuation of the pertinent tensile stress that is associated therewith is essentially prevented, as would be the case if only a constant tensile force were to be applied.

Consequently, in the passing band-shaped material in the case of the constant tensile stress, a correspondingly constant anisotropy $K_u$ can be induced, which causes a likewise constant permeability μ. In addition, still further parameters are known that can influence and change an induced anisotropy in this production method, in this respect including, for example, the heat-treatment temperature, the speed of passage of the band-shaped material, the path for exposure to the heat-treatment temperature (i.e., a furnace length), the (average) thickness of the band-shaped material, the heat conduction and the heat transfer to the band-shaped material and/or the type of chosen alloy as well as parameters of the magnetic field that can be optionally provided.

Since these parameters can never be kept constant in practice, the control of the tensile stress, therefore a force that can be variably set in the process in the tape, can be used to keep the induced anisotropy $K_u$ and thus the permeability μ constant over the tape length. To do this, the force in the tape is varied, for example, in small steps by a tensile stress setpoint in order to compensate for local influences, such as temperature differences, tape thickness fluctuations, minor deviations of the passage speed, changes in the material composition, etc.

Therefore, for example, by means of controlling the tensile force as a function of a determined magnetic measurement value for setting a desired tensile stress, the induced anisotropy $K_u$ and thus the permeability can be kept constant over a defined segment or even over the entire length of the band-shaped material.

If the tensile stress is kept constant or continuously changed only in segments by means of the described control, this additionally makes it possible, by changing a corresponding setpoint, to keep the tensile stress constant in a first segment at a first value and in a second subsequent segment at a second value. Of course, also more than two segments can be provided with an individually set constant tensile stress value in each case. Then, for example, each segment can be used for winding its own core and thus cores with different magnetic properties can be produced in succession.

For example, the control of the tensile force comprises an automatic setting of the tensile stress by a predefined tensile stress setpoint. The tensile force applied to the band-shaped material can therefore be automatically varied in small steps or continuously by the tensile stress setpoint in reaction to the at least one magnetic measurement value in order to compensate for local effects in the band-shaped material, such as, for example, temperature differences, fluctuations of tape thickness, deviations of the passage speed and/or changes in the material composition.

For example, the tensile force is continuously adjusted, i.e., continuous checking and (repeated) adjustment take place. A predefined setpoint, as described above, can likewise be provided only for a defined segment of the band-shaped material so that in each case, individual tensile stress levels can be assigned to one or more successive segments, as a result of which over the length of the respective segment, the induced anisotropy and the permeability achieved with it can be set in a dedicated manner in a wide range.

Thus, for example, depending on a chosen material composition of the band-shaped material or of an alloy used for it, a permeability μ in the range of less than 100 to 10,000 can be achieved. In particular, a relatively low permeability μ is especially advantageous for current transformers, power transfer systems, storage inductors and other applications in which the roll tape-wound core that has been produced will be saturated in a non-ferromagnetic manner so that an inductance of the roll tape-wound core is not adversely affected when high electrical currents flow through the windings around the roll tape-wound core.

In this case, respectively suitable permeability values result from the specific requirements of the respective application. For example, a range that is suitable for the aforementioned application for $\mu$ can be 1,500 to 3,000, 200 to 1,500, or 50 to 200. Thus, for example, for direct current-tolerant current converters, a permeability $\mu$ from roughly 1,500 to roughly 3,000 is advantageous, while for power transfer systems, a permeability range of from 200 to 1,500 is suitable, and for storage inductors, a permeability range of from roughly 50 to 200 is suitable. Of course, however, other ranges of values can also be provided.

The described embodiments therefore offer the advantage that a combination of the two aforementioned aspects, specifically being able to keep the tensile stress constant over wide ranges and specifying a tensile stress level in segments by a respective tensile stress setpoint, is enabled. For example, it is not enough to apply only a high tensile force to the band-shaped material in order to achieve low permeability since the attained target permeability would thus be exactly set only for a certain local region of the band-shaped material. Rather, in addition to the defined tensile force level, very fine and mainly trouble-free tensile force variations must be able to be carried out in order to be able to keep the tensile stress, as described, at a constant value.

In other words, with the described method, soft magnetic strip material with one or more different respectively constant permeability levels or with continuously changing permeability can be produced, and each level can be produced by means of the control according to the invention with very small deviations from the specified permeability setpoint over the entire strip length or over one or more defined segments.

Furthermore, the method as an optional step can comprise the application of a magnetic field to the band-shaped material (magnetic field treatment), whereby the magnetic field treatment can take place, for example, subsequently or at the same time as the heat treatment. Of course, treatment can also be provided with more than one magnetic field, such as, for example, several magnetic fields, with different three-dimensional alignment in each case.

The method can, moreover, comprise a step of winding on at least one defined segment of the produced soft magnetic strip material for producing at least one annular tape-wound core following the step of determining at least one magnetic measurement value. The produced strip material can thus be wound up into one or more annular tape-wound cores following the above-described steps. Since a permeability characteristic as constant or continuous as possible is produced at one or more levels by means of the described method, cores can be produced therefrom with a very constant permeability distribution in each case within the core but also with small sample dispersions of several cores with the same setpoint for the permeability.

According to another embodiment, the winding-on step is controlled in a reaction to the at least one magnetic measurement value. This enables, for example, a controlled winding-on of defined segments that are determined via a characterization by means of the determined magnetic measurement value. If, therefore, for example, a different permeability level is reached, therefore a sudden change in the permeability characteristic is detected or produced, the winding-on can be controlled accordingly. Thus, for example, the winding-on of a first core can be ended, and a winding-on of a new core can be started.

According to another embodiment, the step of winding-on comprises a winding-on of a defined number of tape layers of the soft magnetic strip material produced for making at least one annular tape-wound core, a definition of the number of tape layers taking place in reaction to at least one magnetic measurement value. To do this, for example, the local tape thickness and the magnetic cross-sectional area associated with it are considered for the step of winding-on. Even before the actual winding-on, a number of tape layers can be determined and within the scope of the winding-on can be varied such that the wound core has a predefined core cross-sectional area $A_{KFe}$.

The described method consequently offers the possibility of producing a number of cores, each of the cores in addition to a defined permeability characteristic over the length of the wound-on strip material, moreover, having a defined core cross-section with a core cross-sectional area.

Thus, the shape of the tape enables not only a processing of the alloy under tensile stress in a continuous annealing unit that is presented in more detail below, but also the production of roll tape-wound cores with any number of windings. In this way, the size and the magnetic properties of a roll tape-wound core can be easily matched to an intended application by a corresponding choice of the number of windings or tape layers.

For example, in this case, the number of tape layers can be varied such that a cross-sectional area $A_{KFe1}$ of a first annular tape-wound core and a cross-sectional area $A_{KFe2}$ of a second annular tape-wound core are essentially the same size. Thus, any number of annular tape-wound cores with in each case a core cross-sectional area of the same size can be produced, but at least with a very minor deviation of the respective core cross-sectional area. The number of tape layers can also be varied, for example, such that alternatively or in addition, the permeability of the first annular tape-wound core and the permeability of the second annular tape-wound core are essentially the same size.

Thus, the effect of the permeability that is constant at least in segments and the effect of an equally large core cross-sectional area can also be supported by an averaging process when the respective core is being wound on. By means of this superposition during winding-on, the respectively positive and negative deviations from a predefined setpoint are compensated beyond a defined length (for example, several meters) of the strip material. Thus, in a single coherent production method or process, a completely examined core with very good sample dispersion with respect to permeability and the core cross-sectional area can be attained from an initial material via a heat treatment up to core production. In this way, more narrow core tolerances are enabled so that smaller cores can be produced that in turn contribute to material and cost savings.

The special importance of the magnetic measurement values that have been measured in the produced soft magnetic strip material for the cores that are then wound from it and the respective low sample dispersion achieved herewith is presented in more detail below. Conventionally, the heat-treatment temperature and a passage speed of the band-shaped material depending on the respectively chosen alloy are selected such that a magnetostriction in a nanocrystalline state of the correspondingly heat-treated soft magnetic strip material is almost zero. This can be regarded as a basic condition for winding a core from the heat-treated soft magnetic strip material, which core even after the winding process in its wound-on state has a similar or even identical permeability as the unwound strip material. This is substantiated in that a product of the bending stresses caused by the winding-on and of the value of the magnetostriction constitutes an additional anisotropy induced in the strip material and therefore must be kept as small as possible. If this cannot be achieved, in the other case the permeability of the wound core would differ more or less dramatically from that of the strip material.

Moreover, it can be stated that an anisotropy that is as high as possible induced in the method of producing the soft magnetic strip material causes the core to become increasingly insensitive to the additional anisotropies that are always uniformly small due to the winding stresses. FIG. 6 shows a corresponding comparison of a hysteresis measured on unwound soft magnetic strip material and a hysteresis determined on the wound roll tape-wound core.

As already mentioned, the band-shaped material that is made available as the initial material within the scope of the described method can be heated under tensile stress in order to produce the desired magnetic properties. Here, the chosen temperature is of great importance since the structure of the material is influenced depending on it. This temperature can be chosen such that the heat-treatment temperature is below a crystallization temperature of the band-shaped material for maintaining an amorphous state of the band-shaped material or such that the heat-treatment temperature is above a crystallization temperature of the band-shaped material for conversion of the band-shaped material from the amorphous state into a nanocrystalline state.

For example, the nanocrystalline state for the roll tape-wound cores is advantageous and responsible for the outstanding soft magnetic properties of the strip material that has been produced. Thus, the nanocrystalline structure yields a low saturation magnetostriction with simultaneously high saturation polarization. The proposed heat treatment under defined tensile stress with a suitable choice of the alloy results in a magnetic hysteresis with a central linear part. Low magnetism reversal losses and a permeability that is independent of the applied magnetic field and of the premagnetization in the linear central part of the hysteresis within wide limits, which are desirable in roll tape-wound cores for the aforementioned applications, are associated with this.

In addition to the already explained steps for processing, a suitable choice of the band-shaped material is also of great importance for the magnetic properties of the produced roll tape-wound core. Preferably, the band-shaped material comprises (any) rapidly solidified magnetic material that comprises, for example, at least one component from a group of amorphous Co alloys, Co—Fe alloys or Co—Ni alloys and/or Fe, Fe—Ni alloys. For the Co, Co—Fe and Co—Ni alloys, the heat-treatment temperature is below a crystallization point, and for the Fe, Fe—Ni alloys, the heat-treatment temperature is above the crystallization point.

For example, amorphous Co-, Ni- and/or Fe-based alloys can be used as initial materials. The alloys known under the trade names VITROVAC® and/or VITROPERM® of the applicant as well as other materials that are suitable as magnetic materials can also be used.

An Fe-based alloy can consist of, for example, $$Fe_{100-a-b-c-d-x-y-z}Cu_aNb_bM_cT_dSi_xB_yZ_z$$

with up to 1 atom % impurities. In this case, M stands for one or more of the elements Mo, Ta or Zr; T stands for one or more of the elements V, Mn, Cr, Co or Ni; Z stands for one or more of the elements C, P or Ge, the following applying for a, b, c, d, x, y, z:

0 atom %≤a<1.5 atom %,
0 atom %≤b<4 atom %,
0 atom %≤(b+c)<4 atom %,
0 atom %≤d<5 atom %,
10 atom %<x<18 atom %,
5 atom %≤y<11 atom %, and
0 atom %≤z<2 atom %.

This alloy is likewise cast preferably in the form of a tape and at least after heat treatment has a nanocrystalline structure for which at least 50% by volume of the grains of the structure have an average size of less than 100 nm. The above-mentioned alloy also preferably has a hysteresis with a central part, a remanence ratio $J_r/J_s<0.1$, and a ratio of a coercive field intensity $H_s$ to an anisotropy field intensity $H_A<10\%$. Optionally, the last-mentioned alloy can be free of niobium or copper.

According to one embodiment of the invention, the at least one magnetic measurement value is determined in real time. In this case, it is possible to carry out a magnetic characterization “in-line” within a production line in current operation. One exemplary choice of magnetic measurement values is again described below.

In this way, it is possible for the band-shaped material and the produced soft magnetic strips to pass through a production device at full speed without having to interrupt or slow the process for the determination.

For example, the at least one magnetic measurement value can be chosen from a group consisting of the magnetic saturation flux, the magnetic tape cross-sectional area $A_{Fe}$, the anisotropy field intensity, the permeability, the coercive field intensity and the remanence ratio of the produced soft magnetic strip material. It is common to all of these measurement values and the pertinent magnetic properties of the produced strip material that they are dependent on a tensile stress that has been applied to the material and thus they can be controlled accordingly by means of the described method.

If the step of determining the magnetic measurement value likewise comprises a determination of the local magnetic cross-sectional area $A_{Fe}$, this allows not only a soft magnetic strip material to be produced that, as described, has a permeability characteristic as constant as possible along its length, but, moreover, at the same time allows information about the thickness characteristic of the produced strip material to be obtained. This combination makes it possible to wind from the produced strip material annular tape-wound cores with very accurately adjustable permeability values and at the same time adjustable core cross-sectional areas $A_{KFe}$ of the annular tape-wound core by a required strip length being able to be defined already prior to the actual winding-on.

Furthermore, a device for producing soft magnetic strip material is proposed with

- an entry-side material feed for making available band-shaped material,
- a heat-treatment device for heat treatment of the band-shaped material at a heat-treatment temperature,
- a clamping device for applying a tensile force to the heat-treated band-shaped material for producing a tensile stress in a longitudinal axis of the tape of the band-shaped material at least in the region of the heat-treatment device,
- the clamping device being made adjustable for varying the tensile force in the band-shaped material in order to adjust the tensile stress, to produce the soft magnetic strip material, the device, moreover, comprising a measurement arrangement for determining at least one magnetic measurement value of the produced soft magnetic strip material, and there being a control unit for controlling the clamping device that is made and connected to the measurement arrangement such that the control of the clamping device comprises controlling the tensile force in reaction to the at least one determined magnetic measurement value.

The device can furthermore comprise a winding unit with at least one winding mandrel for winding-on of a defined segment of the produced soft magnetic strip material for producing at least one annular tape-wound core, the winding unit being made and connected to the measurement arrangement such that the winding-on takes place in reaction to the at least one determined measurement value.

Furthermore, the device can comprise a device for producing at least one magnetic field for applying at least one generated magnetic field to the heat-treated material.

The magnetic field can be aligned transversely and/or perpendicularly to the longitudinal axis of the tape or tape surface.

For example, the clamping device for producing the tensile force in the band-shaped material can be configured such that the band-shaped material can still advance continuously and the tensile force can be varied according to the input of the control unit based on the magnetic measurement value that has been determined by the measurement arrangement. For example, the clamping device must be able to deliver a sufficiently high tensile force into the band-shaped material and ensure a required accuracy, for example to allow reproducible tensile force changes and to be able to apply and ensure the given tensile force even in plastic elongation of the band-shaped material.

To do this, the clamping device for producing the tensile force comprises two S-shaped roller drives that are coupled to one another, a dancer roll control and/or an oscillation control as well as torque-controlled brake drives and/or mechanically-braked rollers. Of course, however, other suitable clamping devices can also be used that satisfy the above-mentioned requirements.

Preferably, the band-shaped material that has been made available by means of the entry-side material feed comprises a material that has been wound into a coil and/or that is cast band-shaped and/or that has been cut off to a final width. By means of this prefabrication, simple processing in a heat-treatment device, such as, for example, a continuous annealing system, is possible.

For example, the measurement arrangement is located in a segment following the heat-treatment device and/or the clamping device so that the produced soft magnetic strip material passing through the measurement arrangement is free of the tensile force that has been made available by the clamping device. Of course, a certain tension or tensile force can still prevail for transport and winding of the strip material.

Moreover, an annular tape-wound core is proposed that comprises a wound soft magnetic strip material, the soft magnetic strip material and/or the core having been produced according to the above-described method.

According to one embodiment, the soft magnetic strip material can be coated with an insulating layer in order to electrically insulate the windings of the annular tape-wound core from one another. The layer can be, for example, a polymer layer or a ceramic layer. The tape before and/or after winding into an annular tape-wound core can be coated with the insulating layer.

Of course, the aforementioned features and those still to be explained below can be used not only in the respectively given combination, but also in any other suitable combinations or alone.

BRIEF DESCRIPTION OF DRAWINGS

The embodiments of the invention are explained in more detail below using the embodiments shown in the figures of the drawings. Here.

DETAILED DESCRIPTION OF SPECIFIC EMBODIMENTS

Figure 1:
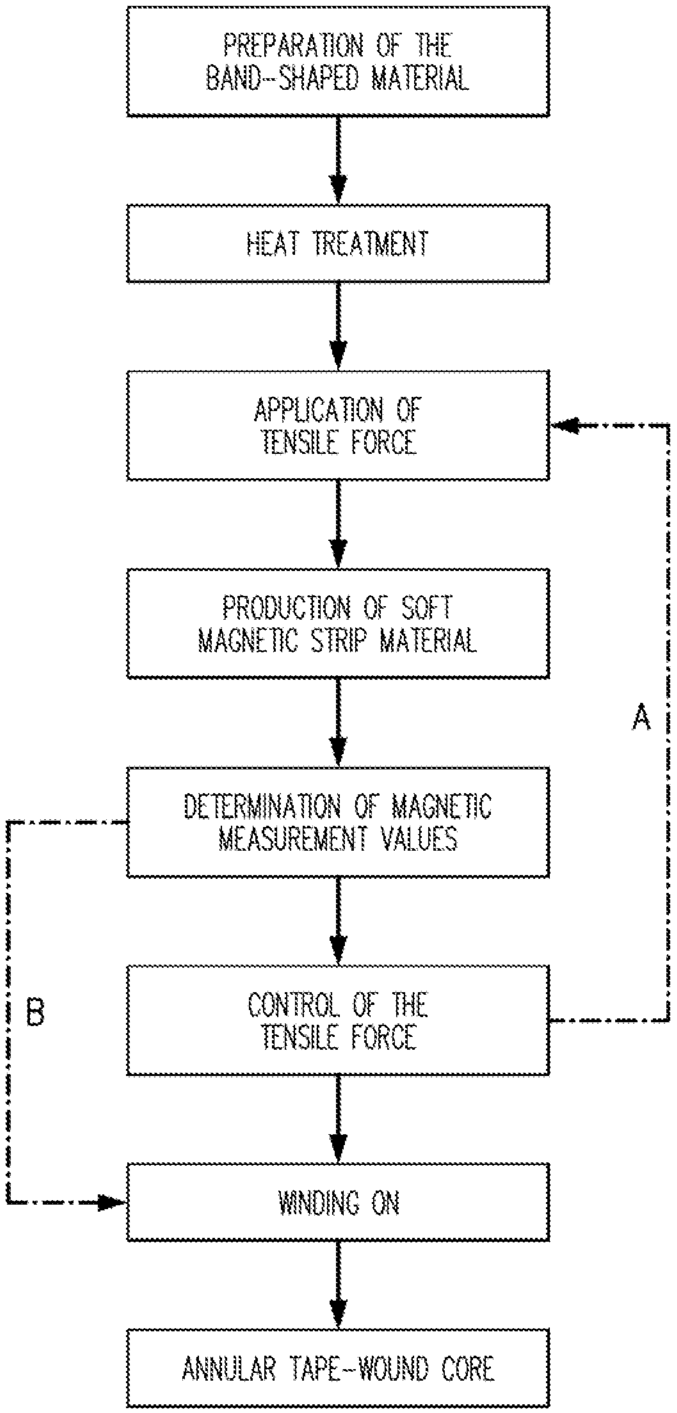
FIG. 1 shows in a schematic the progression of the method according to the invention in accordance with a first embodiment.

FIG. 1 schematically shows an exemplary progression of the method according to the invention for producing soft magnetic strip material for annular tape-wound cores according to a first embodiment. The method comprises making available a band-shaped material, the heat treatment of the band-shaped material at a heat-treatment temperature and the application of a tensile force to the heat-treated band-shaped material in one longitudinal direction of the band-shaped material in order to produce a tensile stress in the band-shaped material. These steps are used to produce the soft magnetic strip material from the band-shaped material. Moreover, the method comprises a determination of at least one magnetic measurement value of the produced soft magnetic strip material and a control of the tensile force for adjusting the tensile stress in reaction to the determined magnetic measurement value (arrow A).

Optionally, the method comprises one step of the winding-on of at least one defined section of the produced soft magnetic strip material for producing at least one annular tape-wound core following the step of determining the at least one magnetic measurement value. For example, the step of winding-on is controlled or adjusted in reaction to the at least one magnetic measurement value (arrow B).

Figure 2:
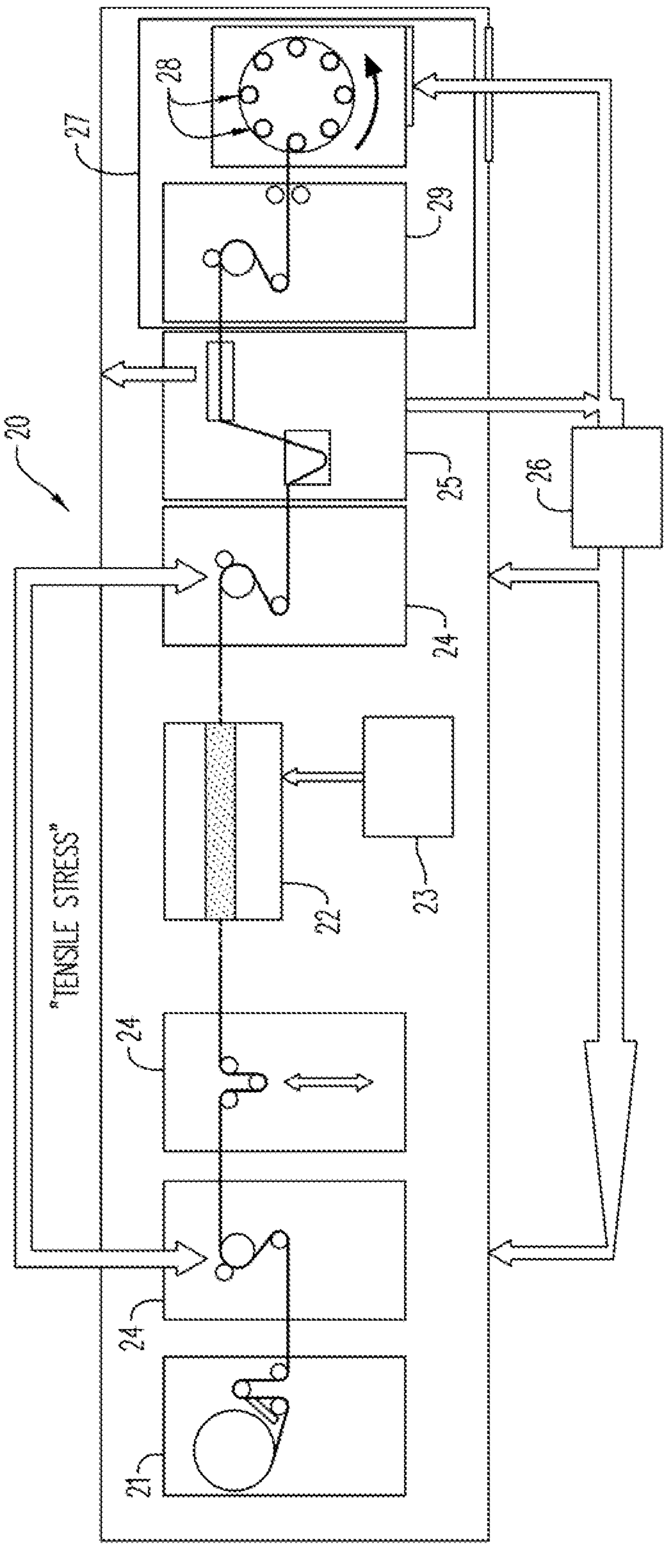
FIG. 2 shows in a schematic an exemplary embodiment of a device according to an embodiment of the invention.

FIG. 2 shows a schematic of a device 20 according to the invention for producing soft magnetic strip material according to one embodiment. The device 20 comprises an entry-side material feed 21 for making available band-shaped material, a heat-treatment device 22 for the heat treatment of the band-shaped material at a heat-treatment temperature, and a clamping device 24 for the application of a tensile force to the band-shaped material for making available a tensile stress in one longitudinal axis of the tape of the band-shaped material at least in the area of the heat-treatment device 22. The clamping device 24 is made adjustable for a variation of the tensile force in the band-shaped material in order to set the desired tensile stress to produce the soft magnetic strip material.

The device 20, moreover, comprises a measurement arrangement 25 for determining at least one magnetic measurement value of the produced soft magnetic strip material and a control unit 26 for controlling the clamping device 24, the control unit 26 being made and connected to the measurement arrangement 25 such that the control of the clamping device 24 comprises controlling the tensile force in reaction to the at least one determined magnetic measurement value. In the illustrated embodiment, the clamping device 24 comprises two S-shaped roller drives that are coupled to one another and a dancer roll control. The roller drives can in addition or alternatively also have different speeds, the roller drive that is first in the direction of movement being able to have a slightly lower drive speed than the following roller drive, as a result of which then an additional tensile force can be produced between the two roller drives. Alternatively, in this case, the first roller can also be braked instead of driven. The dancer roll control can also be used, besides for tensile force generation, to compensate for speed fluctuations. Alternatively or in addition, there can be an oscillation control.

Optionally, the device 20 comprises a device 23 for producing at least one magnetic field for applying the at least one magnetic field to the heat-treated tape material and/or a winding unit 27 with several winding mandrels 28 for winding-on one defined segment of the produced soft magnetic strip material at a time for producing a number of annular tape-wound cores, the winding unit 27 being made and connected to the measurement arrangement 25 such that the winding-on takes place in reaction to the at least one determined measurement value. Likewise, the winding unit 27 optionally comprises an additional S-shaped roller drive 29 for feed of the strip material to the respective winding mandrel 28.

Figure 3A:
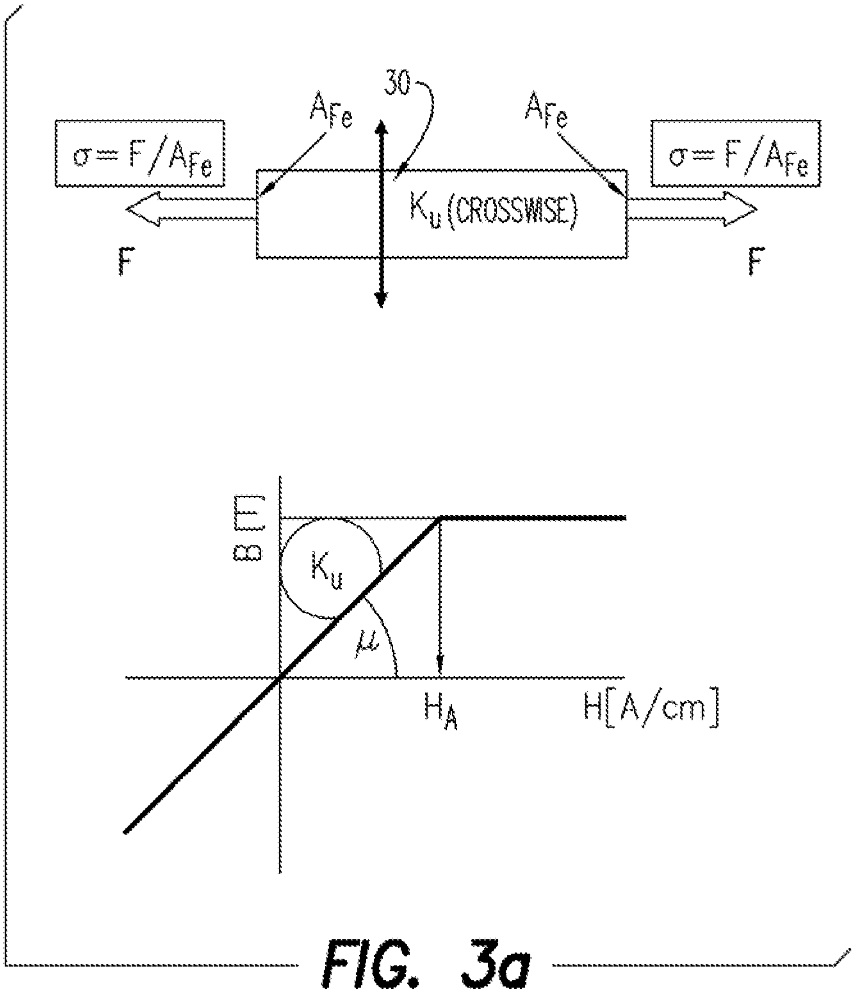
FIGS. 3A and 3B show the basics of the tensile stress-induced anisotropy, definition of the mechanical and magnetic terms and in two diagrams the relationship between a tensile stress delivered into a band-shaped material and a resulting anisotropy or permeability.
Figure 3B:
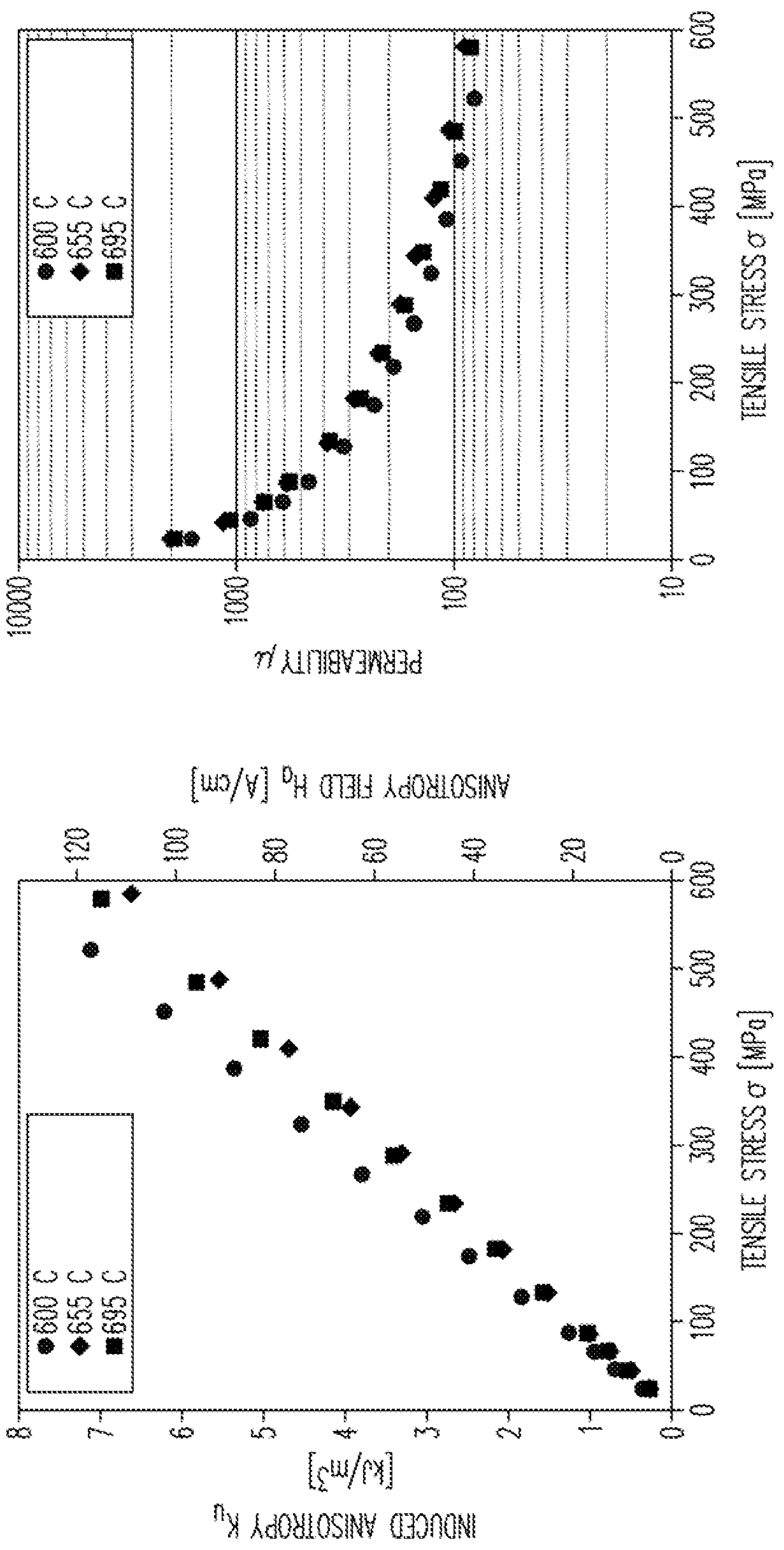

FIGS. 3A and 3B show a relationship between a tensile stress delivered into a band-shaped material 30 by means of a tensile force F and a resulting anisotropy $K_u$ and permeability A tensile stress $\sigma$ prevailing locally in the band-shaped material 30 results from the prevailing tensile force F and a local magnetic cross-sectional area $A_{Fe}$ (material cross-section):

$$\sigma = \frac{F}{A_{Fe}}$$

so that an induced anisotropy $K_u$ in the transverse direction to the longitudinally-extended band-shaped material 30 according to the diagram shown in FIG. 3*b* rises as a function of the tensile stress $\sigma$. A permeability $\mu$ is set via the applied tensile stress $\sigma$ and results in the known manner from the average slope of the hysteresis loop and from a magnetic flux density $B_s$ (saturation magnetization) or a magnetic field intensity H (anisotropy field intensity $H_a$) as well as a magnetic field constant $\mu_0$ in conjunction with the anisotropy $K_u$ as follows:

$$\mu = \frac{1}{2}\frac{B_S^2}{\mu_0 K_U}$$

If therefore, for example, there is a fluctuating thickness of the band-shaped material due to production, accordingly when a uniform width is assumed, the local cross-sectional area $A_{FE}$ and with it, at constant tensile force F, the prevailing tensile stress $\sigma$ fluctuate. This in turn causes a corresponding change of the induced anisotropy $K_u$ that via the indicated relationships influences the permeability $\mu$ accordingly so that it also changes over the length of the soft magnetic strip material that has been produced with it from the band-shaped material.

FIG. 3*b*, moreover, shows a characteristic of the permeability as a function of the tensile stress $\sigma$ for three heat-treatment temperatures.

Figure 4:
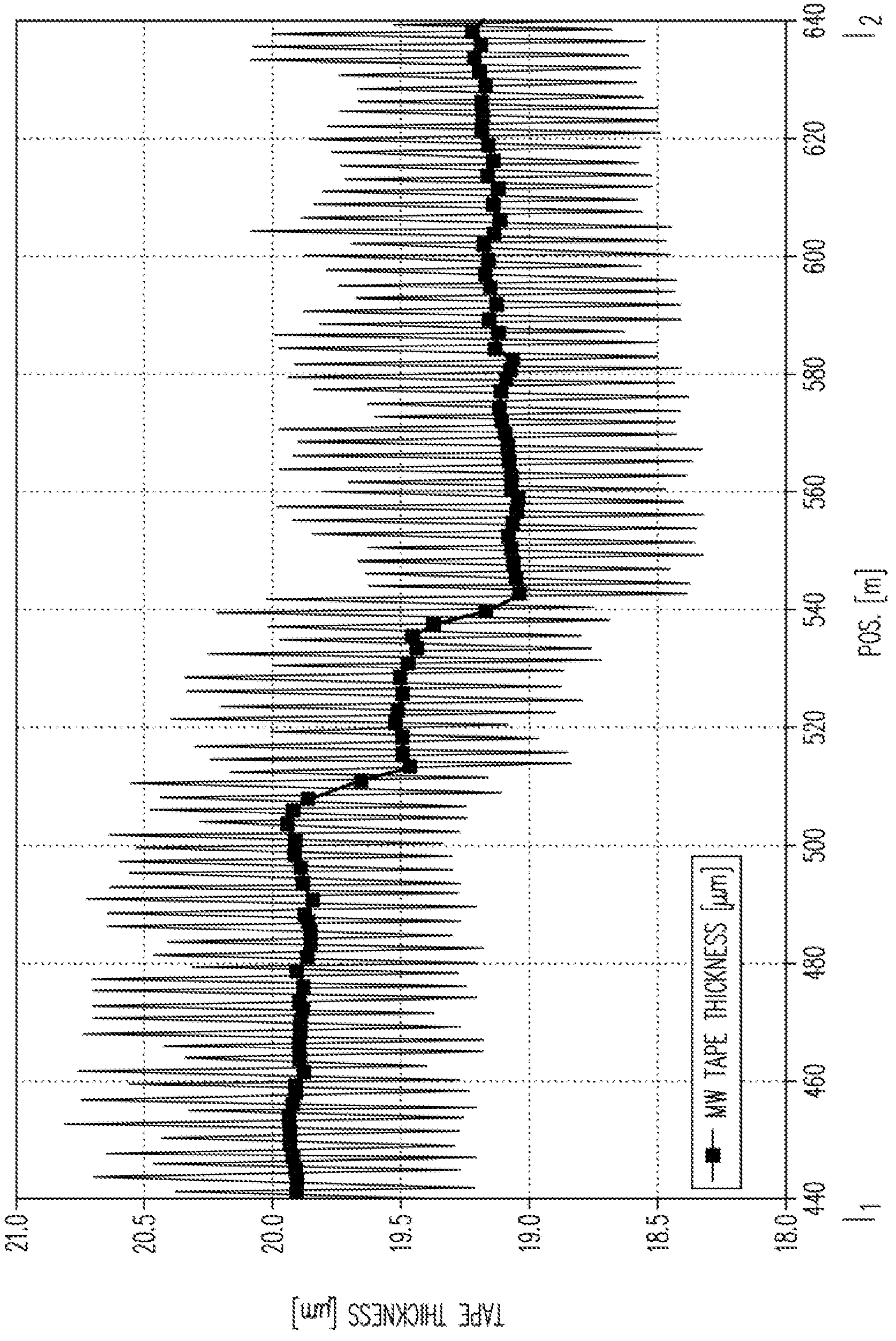
FIG. 4 shows in a diagram by way of an extract an exemplary thickness characteristic of the band-shaped material in detail.

FIG. 4 shows, by way of an extract, an exemplary characteristic of the thickness of the band-shaped material 30 from FIG. 3, in which local effects in the band-shaped material become noticeable. For this purpose, an extract of the band-shaped material 30 between an axial longitudinal position of $l_1$=440 m and $l_2$=640 m is shown, only by way of example, with VITROPERM® being used as the material. Within this interval $\Delta l$=200 m, sudden tape thickness changes are shown that are caused by a production process, for example a rapid solidification technology used for this purpose (with any suitable material). Here, for example, local variations of the tape thickness occur and can be ascribed to the production method. The latter move in the illustrated measurements at roughly 1 to 2 μm, but conventionally can also be over 3 to 4 μm, and thus can cause major sudden changes in a thickness characteristic of the band-shaped material that is used as the initial material for the described method.

Figure 5:
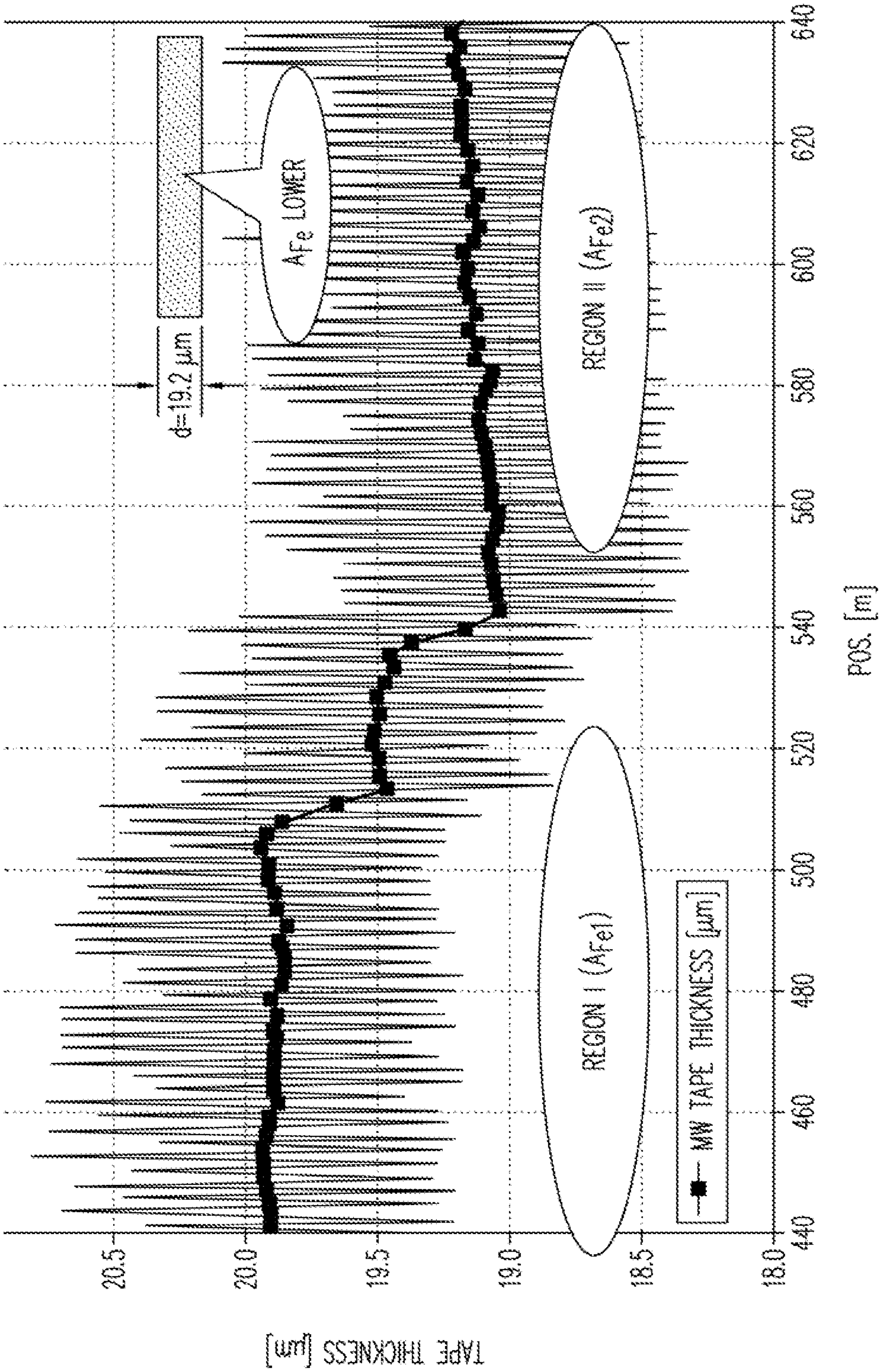
FIG. 5 shows in a diagram the characteristic shown in FIG. 4 with delineations of regions.

FIG. 5 again shows the characteristic of the thickness of the band-shaped material shown in FIG. 4. In the region I of a higher tape thickness (left-hand region), the relationships already presented above, assuming a constant width of the band-shaped material, yield a larger local cross-sectional area $A_{FE1}$ of the band-shaped material than a second local cross-sectional area $A_{FE2}$ in the adjacent right-hand region II with a smaller tape thickness. This results in that a local tensile stress $\sigma_1$ in the case of a constant tensile force in the left-hand region I is accordingly lower than in the right-hand region II ($\sigma_2$). Since at this point the induced anisotropy and with this also the permeability $\mu$ are a function of the local tensile stress $\sigma$ in the band-shaped material, the characteristic of the local permeability will also be varying. To prevent this, according to the described method, it is proposed that the tensile force F not be kept constant, but rather that it be continuously adapted such that the influences and effects caused by the material and the production are compensated by continuous adjustment of the tensile force for setting a constant tensile stress in the band-shaped material.

Figure 6:
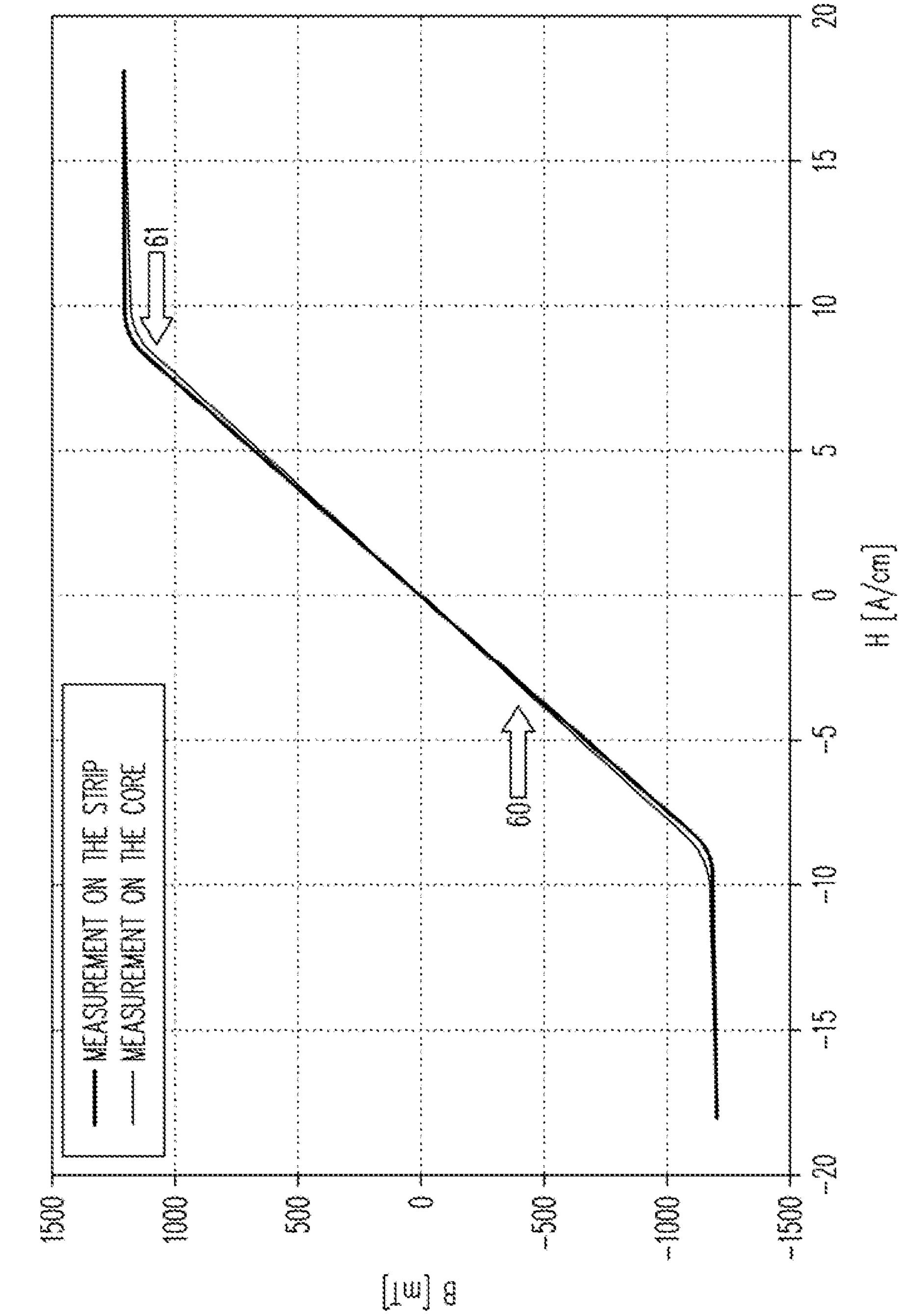
FIG. 6 shows in a diagram the comparison of a hysteresis measured on the unwound soft magnetic strip material to a hysteresis determined on the wound core.

FIG. 6 shows a comparison of a hysteresis 60 that has been measured on the unwound soft magnetic strip material and a hysteresis 61 that has been determined on the wound core.

In order to prepare from the unwound soft magnetic strip material according to the method in accordance with the invention a wound-on roll tape core that has a permeability as similar as possible or even identical to that of the strip material, the heat-treatment temperature and a passage speed should be adjusted depending on a chosen material or a chosen alloy such that a magnetostriction is near zero in a nanocrystalline state of the strip material.

The product of the bending stresses due to the winding-on of the strip material and the magnetostriction value constitutes an additional anisotropy induced in the wound-on strip material and should therefore be kept as small as possible. Otherwise, the permeability of the core would differ more or less dramatically from that of the unwound strip material.

Thus, it applies that the higher the anisotropy that has been induced when the unwound soft magnetic strip material is produced, the less sensitive the roll tape-wound core becomes against the additional anisotropies that are always uniformly small due to the winding stresses.

As is apparent from the illustrated hysteresis characteristic, there is a permeability μ in the region of 1,000. This corresponds to a small- to medium-strength induced anisotropy. Except for small defects in one region of a discharge point into magnetic saturation, the two hysteresis characteristics for the unwound soft magnetic strip material 60 and the wound-on roll tape core 61 can be regarded as identical.

For higher anisotropies, and therefore smaller permeabilities, the additional anisotropies due to the winding stresses are thus of subordinate importance.

Figure 7:
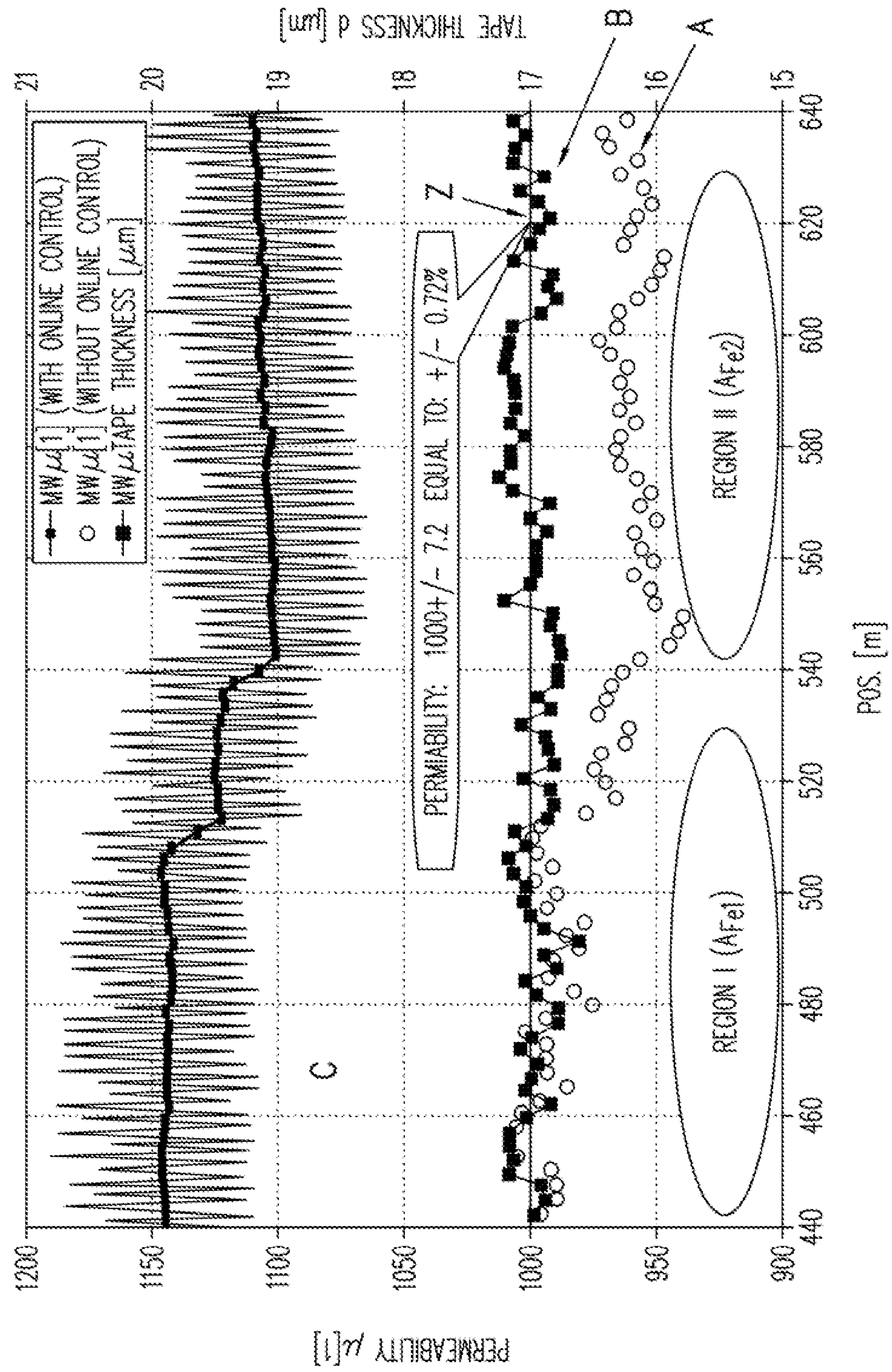
FIG. 7 shows in a diagram the comparison of the respectively attainable permeabilities for a tape according to the state of the art and for a tape that has been produced according to an embodiment of the invention.

FIG. 7 shows a characteristic of an attainable permeability for a chosen length segment Δl=200 m of a first tape of band-shaped material (curve or measurement points A) that was produced with a production method according to the state of the art without tensile force control according to the invention, and a corresponding characteristic of a second tape of band-shaped material (curve B) that was produced with the production method according to an embodiment of the invention. The characteristic of the pertinent average tape thickness is shown as curve C. In order to enable direct comparability, the two tapes were produced from a common tape that had been divided lengthwise, for example by cutting out two adjacent cutting webs from a wide tape. Thus, the two webs have an almost identical tape thickness characteristic. As FIG. 7 furthermore shows, an attained permeability in particular in the region II deviates considerably from a target value Z (in this example at μ=1,000) when the control according to the invention is not used (curve A). If, conversely, the control according to the invention is used (curve B), the attained permeability μ in spite of the fluctuations of the tape thickness characteristic can be kept constant with a comparatively very small deviation of roughly +/−0.72% over several hundred meters.

Figure 8:
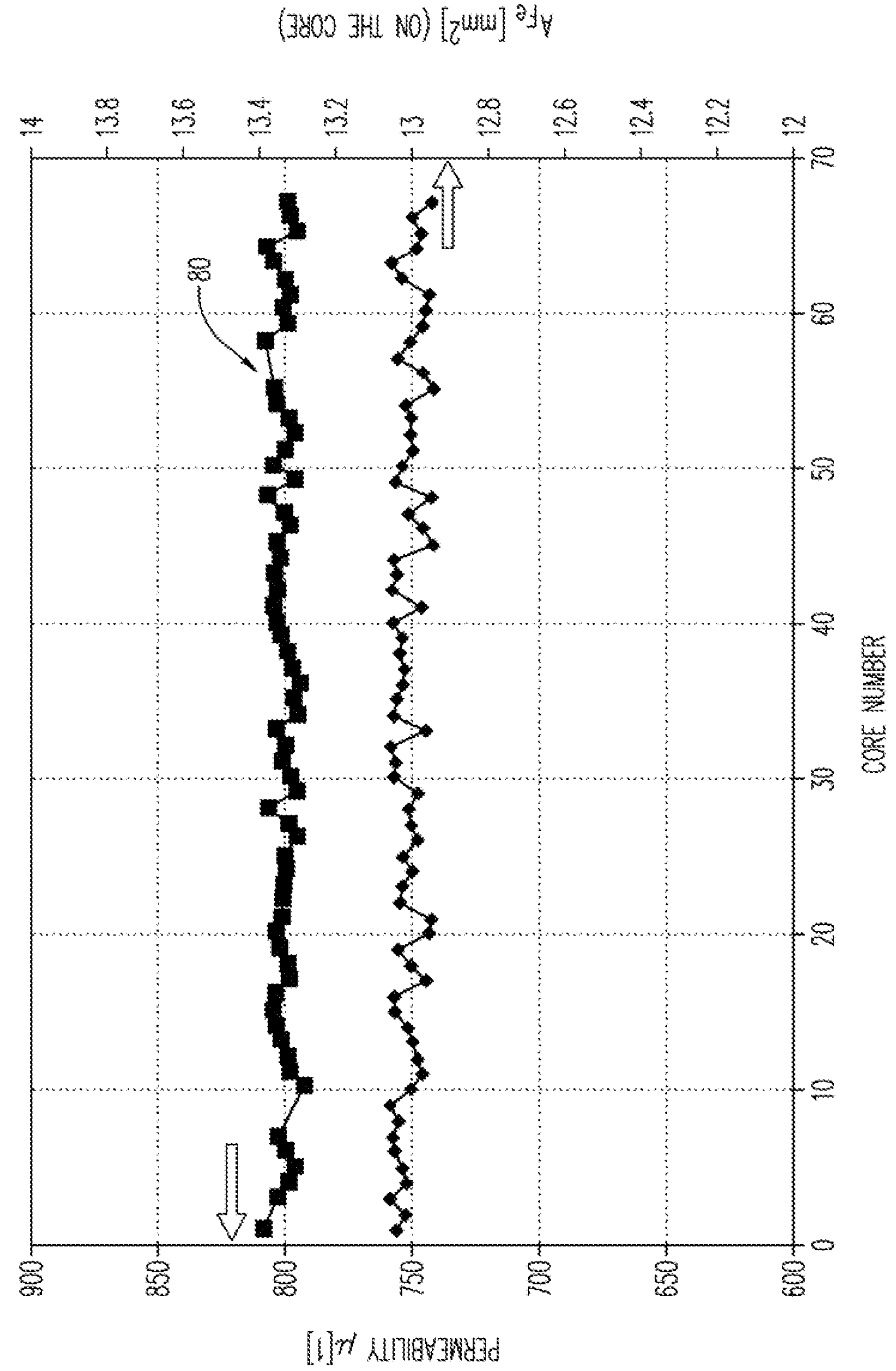
FIG. 8 shows in a diagram exemplary sample dispersions of annular tape-wound cores that have been produced according to an embodiment of the invention.

FIG. 8 shows by way of example a number of measurement points 80 of roll tape-wound cores that are produced by means of the method according to an embodiment of the invention. As the band-shaped material, tape material of type VP800 with a width of 6.2 mm is used. By means of the described device and using the described method, a permeability with a permeability setpoint of μ=800 is stipulated, and by means of the control of the tensile force according to embodiments of the invention, a tensile stress is kept almost constant over several hundred meters of the band-shaped material. Each of the roll tape-wound cores that have been wound from it is produced with a predefined core cross-sectional area $A_{KFe}$ of 13 mm$^2$. The tape length used per core is thus roughly 8 m. This value fluctuates, however, depending on the local tape thickness (or local cross-sectional area $A_{Fe}$) in order to achieve the respectively given predefined core cross-sectional area $A_{KFe}$.

Accordingly, therefore, within the scope of the controlled winding-on process depending on the local tape thickness, more or less tape material is wound into a core until the predefined core cross-sectional area $A_{KFe}$ is reached. The number of correspondingly produced cores shown in FIG. 8 accordingly on average has a permeability of μ=800.7 with a deviation of 0.44%. A pertinent average core cross-sectional area $A_{KFe}$ is 13.01 mm$^2$ and thus has a deviation of only 0.25% compared to the setpoint.

Consequently, cores of soft magnetic strip material with an almost constant permeability characteristic can be produced, and thus a cross-sectional area of the core can be kept as small as possible. The last-mentioned aspect is substantiated in that specific adaptation of a geometry of the individual core based on high dispersion of the permeability in the longitudinal direction of the strip material is not necessary.

For the production of the individual core therefore by means of the method according to embodiments of the invention, a smaller tape length is necessary so that in this way, material can be saved, as a result of which weight and costs of the respective core can, moreover, be reduced. Accordingly, scrap of faulty cores that are somewhat outside of a given specification, such as, for example, due to overly large dimensions or an overly high resulting weight, can be reduced.

The tests underlying FIGS. 6, 7 and 8 were run with VITROPERM 800 as the initial material with a composition of $Fe_{Rest.}Cu_1Nb_3Si_{15.5}B_{6.6}$. The band-shaped material had a tape width of 6.2 mm at a nominal tape thickness of 19 μm. The heat treatment took place in a heat-treatment furnace with a length of 3 m at a heat-treatment temperature of 650° C. and a heat-treatment time in passage of 18 s. For the test results shown in FIGS. 6 and 7, the material was adjusted to a permeability of μ=1,000. For FIG. 8, a permeability of μ=800 was assumed, and a total of 63 cores were produced and tested.

What is claimed is:

1. A method comprising:

preparing a band-shaped material;

heat-treating the band-shaped material at a heat-treatment temperature;

applying a tensile force to the band-shaped material in a longitudinal direction of the band-shaped material during the heat-treating in order to produce a tensile stress in the band-shaped material, thereby producing the soft magnetic strip material from the band-shaped material;

determining at least one first one measurement value and a second measurement value of the band-shaped material during the heat-treating and while applying the tensile force, the at least one first measurement value representing at least one first magnetic parameter and the second measurement value representing a local magnetic cross-sectional area;

controlling, within a production line, the permeability of the soft magnetic strip by controlling the tensile force in response to the at least one first measurement value during the heat-treating and while applying the tensile force;

determining a strip length representing a length of the soft magnetic strip required for producing a magnetic core based on the second measurement value; and, subsequently, winding the determined strip length of the soft magnetic strip to produce an annular tape-wound core.

2. The method of claim 1, wherein the at least one first parameter is selected from the group consisting of: a magnetic saturation flux of the band-shaped material; an anisotropy field intensity of the band-shaped material; a permeability of the band-shaped material; a coercive field intensity of the band-shaped material; and a remanence ratio of the band-shaped material.

3. The method of claim 1 including applying a magnetic field to the band-shaped material during the heat-treating and while applying the tensile force.

4. The method of claim 1, wherein the step of controlling the tensile force comprises at least one of: varying the tensile force such that the tensile stress in a longitudinal direction of the band-shaped material is kept constant at least in segments along the longitudinal direction; and an automatic setting of the tensile stress in accordance with a predefined tensile stress set-point.

5. The method of claim 1, wherein the step of determining the strip length comprises determining a number of tape layers of the soft magnetic strip material needed to form the annular tape-wound core.

6. The method of claim 5, wherein the number of tape layers is determined such that the local magnetic cross-sectional area of the annular tape-wound core corresponds to a desired value.

7. The method of claim 1, further comprising setting the heat-treatment temperature to a temperature higher than a crystallization temperature of the band-shaped material during the heat-treating to cause the band-shaped material to transition from an amorphous state into a nanocrystalline state.

8. The method of claim 1, wherein the band-shaped material comprises rapidly solidified magnetic material with at least one component selected from the group consisting of: amorphous Fe-based alloys, Ni-based alloys, Co-based alloys, Fe—Ni-based alloys, Co—Fe-based alloys, and Co—Ni-based alloys, and wherein the heat-treatment temperature is set to a temperature higher than a crystallization temperature of the band-shaped material during the heat-treating to cause the band-shaped material to transition from an amorphous state into a nanocrystalline state.

9. The method of claim 1, wherein the step of determining the at least one measurement value of the soft magnetic strip material further comprises determining at least one additional measurement value representing an additional magnetic parameter being selected from the group consisting of: the permeability, the coercive field intensity, and the remanence ratio of the band material.

10. The method of claim 1, wherein the band-shaped material comprises a rapidly solidified magnetic Fe based alloy consisting of $Fe_{100-a-b-c-d-x-y-z}Cu_aNb_bM_cT_dSi_xB_yZ_z$ with up to 1 atom % impurities;

wherein M stands for at least one of Mo, Ta and Zr; T stands for at least one of V, Mn, Cr, Co or Ni; and Z stands for at least one of C, P or Ge, and wherein the following applies for a, b, c, d, x, y, and z:

$0$ atom %≤a<1.5 atom %, $0$ atom %≤b<4 atom %, $0$ atom %≤(b+c)<4 atom %, $0$ atom %≤d<5 atom %, $10$ atom %≤x<18 atom %, $5$ atom %≤y<11 atom %; and $0$ atom %≤z<2 atom %.

11. A method for producing an annular tape-wound core, the method comprising:

preparing a band-shaped material;

heat-treating the band-shaped material at a heat-treatment temperature;

applying a tensile force to the band-shaped material in a longitudinal direction of the band-shaped material during the heat-treating in order to produce a tensile stress in the band-shaped material, thereby producing a soft magnetic strip material from the band-shaped material;

determining at least one first measurement value and a second measurement value of the band-shaped material during the heat-treating and while applying the tensile force, the at least one first measurement value representing at least one magnetic parameter and the second measurement value representing a local magnetic cross-sectional area;

controlling, within a production line, the permeability of the band-shaped material by controlling the tensile force in response to the at least one first measurement value during the heat-treating and while applying the tensile force; and winding the soft magnetic strip material after the heat-treating to form the tape-wound core, wherein a wound up length of the magnetic strip material equals a strip length that has been determined, before the winding, based on the second measurement value.

* * * * *